Oct. 16, 1962

T. V. WILLIAMS 3,058,198

ADJUSTABLE BIT CLAMPING MEANS

Filed Oct. 10, 1958

Inventor
Thurston V. Williams
by Roberts, Cushman & Grover
Attys

# United States Patent Office 3,058,198
Patented Oct. 16, 1962

3,058,198
ADJUSTABLE BIT CLAMPING MEANS
Thurston V. Williams, Wilton, N.H., assignor to The O.K. Tool Company, Inc., Milford, N.H., a corporation of New Hampshire
Filed Oct. 10, 1958, Ser. No. 766,612
10 Claims. (Cl. 29—96)

This invention relates to means for holding bits in cutting tools such as milling cutters for example, its objects being to provide bit-holding means which are simple and economical in construction, in which the bit may be adjusted quickly and accurately in each of two dimensions, in which the bit may be clamped in position easily and firmly, which requires no difficult machine work, and which is durable and reliable in use.

In one aspect this invention involves a holder having a recess means for mounting a bit in the recess comprising a clamp having two parts for clamping the bit therebetween, an actuator for the clamp, and an adjustor for varying the extent to which the bit projects from the recess, the actuator and adjustor being carried by the same part of the clamp and the aforesaid recess being rectangular in cross-section so that it may be machined easily.

In another aspect the tool comprises a holder having a recess with an outlet through each of two adjacent faces of the holder and, in the recess, a clamp including two parts for gripping therebetween a bit which projects from the recess beyond both of the aforesaid faces, one of the parts having a bit seat facing toward one of the outlets and the other part having a bit seat facing the other outlet, the positions of the seats determining the extent to which the bit projects through the outlets respectively, and means for adjusting each of the parts transversely of its seat to vary the extent to which the bit projects through the corresponding outlet, the recess being rectangular in cross-section to facilitate its formation. In the preferred embodiment the two adjusting means are accessible from adjacent faces of the holder, preferably the aforesaid faces, and are carried by the same part of the clamp.

Figure 1:
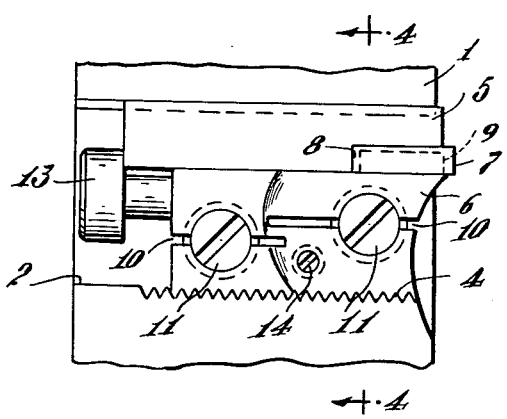
Figure 2:
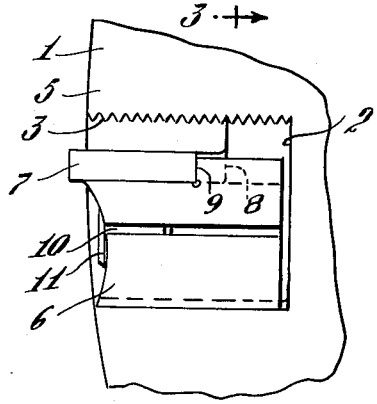
Figure 3:
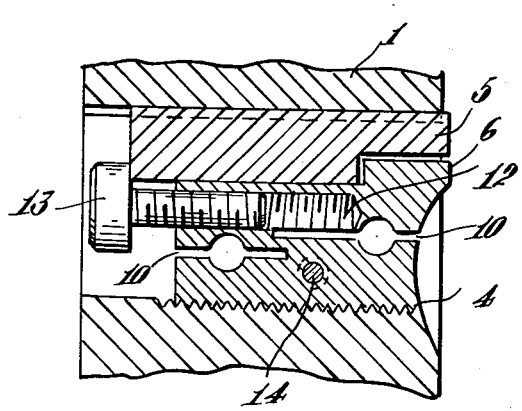
Figure 4:
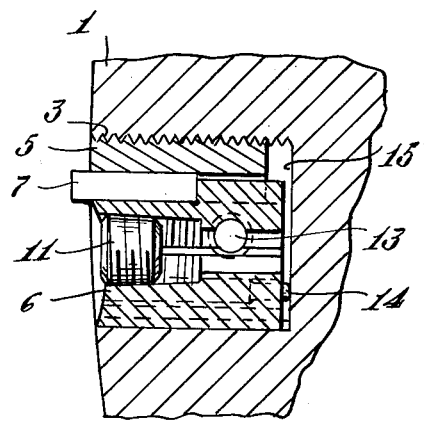

For the purpose of illustration typical embodiments of the invention are shown in the accompanying drawings in which FIG. 1 is a side view of a rotary cutter head;
FIG. 2 is an end view;
FIG. 3 is a section on line 3—3 of FIG. 2;
FIG. 4 is a section on line 4—4 of FIG. 1; and
FIGS. 5 and 6 are views like FIGS. 1 and 2 showing a modification.

The particular embodiment of the invention shown in FIGS. 1 to 4 comprises a rotary holder 1, such as a milling head, having a peripheral recess 2 which extends from end-to-end of the head so that it has an outlet on the peripheral face and also on each end face. One side of the recess has serrations 3 extending parallel to the axis of the head and the other side has serrations 4 extending at right angles to the serrations 3. Disposed in the recess is a clamp comprising two parts 5 and 6 for clamping therebetween a bit 7, the clamp parts having serrations meshing with the serrations 3 and 4. The part 5 has a seat 8 for the bit 7 which faces the end outlet of the recess 2 and the part 6 has a bit seat 9 which faces the peripheral outlet of the recess. The part 6 has two slots 10 so that it may be expanded and threaded into the part. At each slot is a tapered screw 11 for expanding the part. Threaded into an opening 12 in the left-hand end of the part 6 (FIGS. 1 and 3) is a screw 13 for forcing the part 5 to the right. Threaded through the part 6 is a screw 14 which bears on the bottom 15 of the recess 2 so as to push the part 6 toward the peripheral outlet of the recess when it is threaded inwardly.

To assemble the parts they are inserted in the recess with all of the screws retracted and with the serrations 3 and 4 meshing with the serrations of the clamp parts so that the bit projects beyond the end and peripheral faces of the holder slightly less than the desired distance. Then the screws 12 and 14 are advanced until the bit 7 is caused to project through the end and peripheral outlets of the recess the desired distances, after which the screws 11 are tightened to clamp the bit in position.

Figure 5:
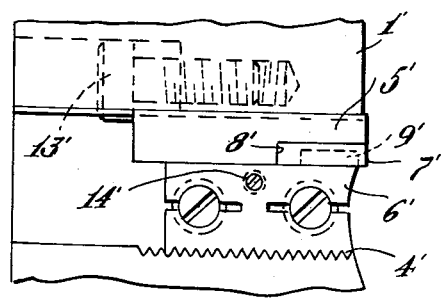
Figure 6:
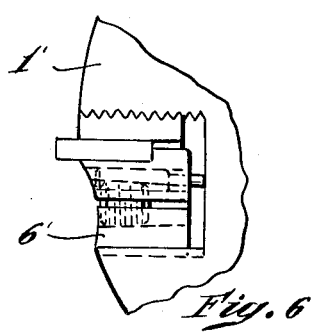

The modification shown in FIGS. 5 and 6 is like that shown in FIGS. 1 to 4 except that the screw 13', corresponding to the screw 13, is threaded into the holder 1' instead of the part 6' of the clamp. As in the first embodiment the bit 7' engages seats 8' and 9' on the parts 5' and 6' and the part 6' is adjusted lengthwise of the serrations 4' by means of a screw 14'.

It should be understood that the present disclosure is for the purpose of illustration only and that this invention includes all modifications and equivalents which fall within the scope of the appended claims.

I claim:

1. Adjustable bit-clamping means comprising a holder having a recess with an outlet through each of two adjacent faces of the holder, in the recess a clamp including two parts for gripping therebetween a bit which projects from the recess beyond both of said faces, one of said parts having a bit seat facing toward one of said outlets and the other part having a bit seat facing the other outlet, a bit fitting between said parts with sides bearing on said seats respectively, the positions of said seats determining the extent to which the bit projects through said outlets respectively, and means for adjusting each of said parts transversely of its seat to vary the extent the bit projects through the corresponding outlet, said recess being rectangular in cross-section.

2. Adjustable bit-clamping means comprising a holder having a recess with an outlet through each of two adjacent faces of the holder, said recess being rectangular in cross-section, in the recess a clamp including two parts for gripping therebetween a bit which projects from the recess beyond both of said faces, one of said parts having a bit seat facing toward one of said outlets and the other part having a bit seat facing the other outlet, a bit fitting between said parts with sides bearing on said seats respectively, the positions of said seats determining the extent to which the bit projects through said outlets respectively, and means for adjusting each of the parts transversely of its seat to vary the extent the bit projects through the corresponding outlet, said means being accessible from adjacent faces of the holder respectively.

3. Adjustable bit-clamping means comprising a holder having a recess with an outlet through each of two adjacent faces of the holder, in the recess a clamp including two parts for gripping therebetween a bit which projects from the recess beyond both of said faces, one of said parts having a bit seat facing toward one of said outlets and the other part having a bit seat facing the other outlet, a bit fitting between said parts with sides bearing on said seats respectively, the positions of said seats determining the extent to which the bit projects through said outlets respectively, and means for adjusting each of said parts transversely of its seat to vary the extent the bit projects through the corresponding outlet, said means being carried by one of the parts.

4. Adjustable bit-clamping means comprising a holder having a recess with an outlet through each of two adjacent faces of the holder, in the recess a clamp including two parts for gripping therebetween a bit which projects from the recess beyond both of said faces, one of said parts having a bit seat facing toward one of said outlets and the other part having a bit seat facing the other outlet, a bit fitting between said parts with sides bearing on said seats respectively, the positions of said seats determining the extent to which the bit projects through said outlets respectively, and means for adjusting each of said parts transversely of its seat to vary the extent the bit projects through the corresponding outlet, and means for clamping the parts together with the bit therebetween, all of said means being carried by one of the parts.

5. Adjustable bit-clamping means comprising a holder having a recess with an outlet through each of two adjacent faces of the holder, in the recess a clamp including two parts for gripping therebetween a bit which projects from the recess beyond both of said faces, one of said parts having a bit seat facing toward one of said outlets, and the other part having a bit seat facing the other outlet, a bit fitting between said parts with sides bearing on said seats respectively, the positions of said seats determining the extent to which the bit projects through said outlets respectively, the recess and each part having interfitting serrations extending transversely of the seat of the part, and means for adjusting each part lengthwise of its serrations.

6. Adjustable bit-clamping means comprising a holder having a recess with an outlet through each of two adjacent faces of the holder, the recess being rectangular in cross-section, in the recess a clamp including two parts for gripping therebetween a bit which projects from the recess beyond both of said faces, one of said parts having a bit seat facing toward one of said outlets and the other part having a bit seat facing the other outlet, a bit fitting between said parts with sides bearing on said seats respectively, the positions of said seats determining the extent to which the bit projects through said outlets respectively, the recess and each part having interfitting serrations extending transversely of the seat of the part, and means for adjusting each part lengthwise of its serrations, said means being accessible from adjacent faces of the holder respectively.

7. Adjustable bit-clamping means comprising a holder having a recess with an outlet through each of two adjacent faces of the holder, in the recess a clamp including two parts for gripping therebetween a bit which projects from the recess beyond both of said faces, one of said parts having a bit seat facing toward one of said outlets and the other part having a bit seat facing the other outlet, a bit fitting between said parts with sides bearing on said seats respectively, the positions of said seat determining the extent to which the bit projects through said outlets respectively, and means for adjusting each of said parts transversely of its seat to vary the extent the bit projects through the corresponding outlet, the recess and each of said parts having interfitting serrations extending transversely of the seat of the part, means for shifting each part lengthwise of its serrations, and means for clamping the parts together with the bit therebetween, all of said means being carried by one of the parts.

8. Adjustable bit clamping means comprising a holder having a recess with an outlet through each of two adjacent faces of the holder, opposite faces of the recess being flat, in the recess a clamp including two parts bearing on said recess faces respectively with a bit space therebetween, one of the parts having a bit seat at one side of said space facing toward one of said outlets and the other part having a bit seat extending transversely of said seat and facing the other outlet, and means for adjusting each of said parts transversely of its seat.

9. Adjustable bit clamping means according to claim 8 further characterized in that said means are on the same part.

10. Adjustable bit clamping means according to claim 9 further characterized in that said same part also carries means for locking the parts in adjusted position.

References Cited in the file of this patent

UNITED STATES PATENTS

| 1,836,472 | Jacobs | Dec. 15, 1931 |
| 2,664,617 | Kralowetz | Jan. 5, 1954 |
| 2,805,468 | Williams | Sept. 10, 1957 |
| 2,859,507 | Knell | Nov. 11, 1958 |
| 2,900,704 | Sweet | Aug. 25, 1959 |

FOREIGN PATENTS

| 1,143,568 | France | Apr. 15, 1957 |